L. L. HARDING.
WEEDER.
APPLICATION FILED MAR. 12, 1920.
1,355,473.
Patented Oct. 12, 1920.
2 SHEETS—SHEET 1.
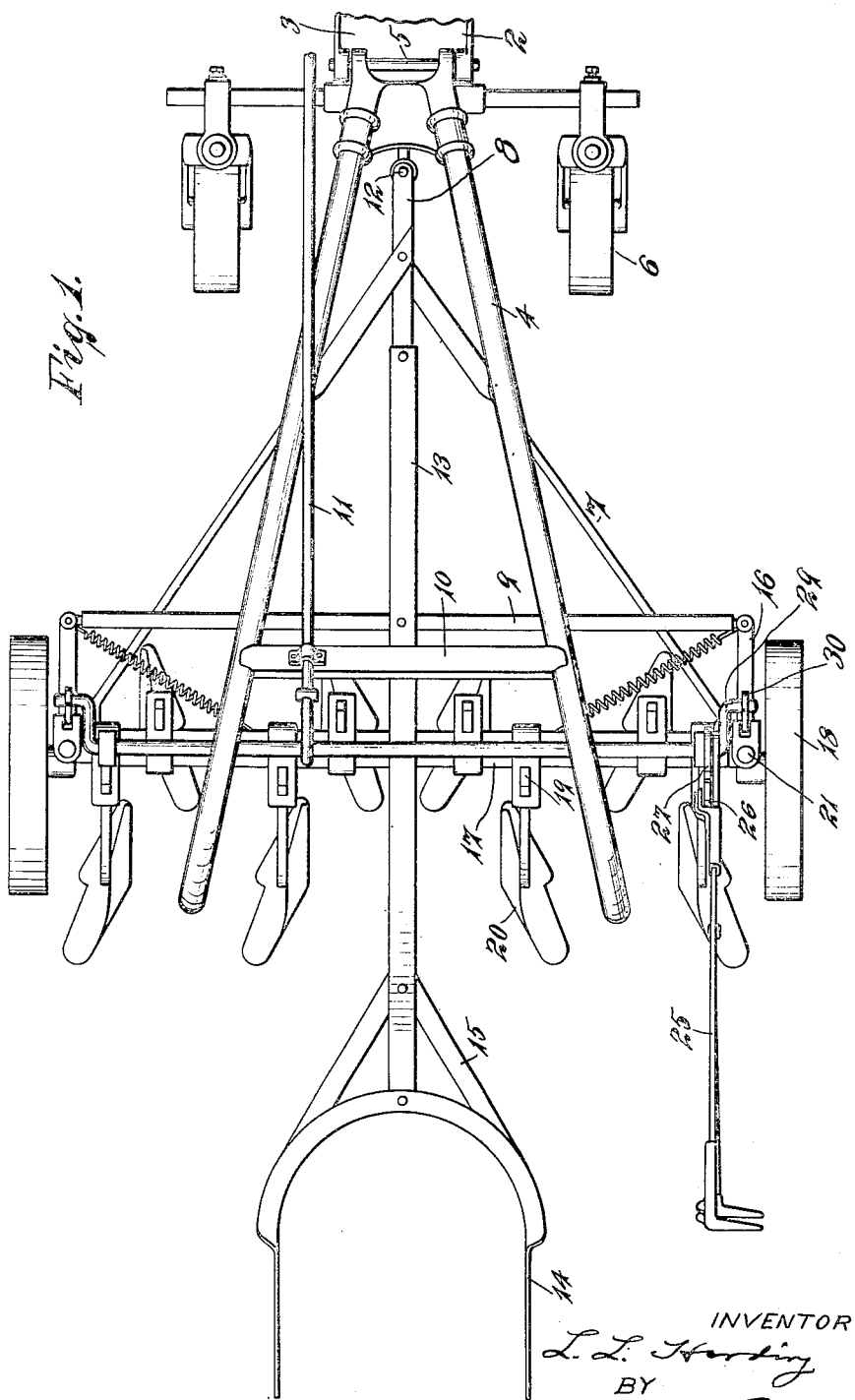
INVENTOR:
L. L. Harding
BY
ATTORNEY.

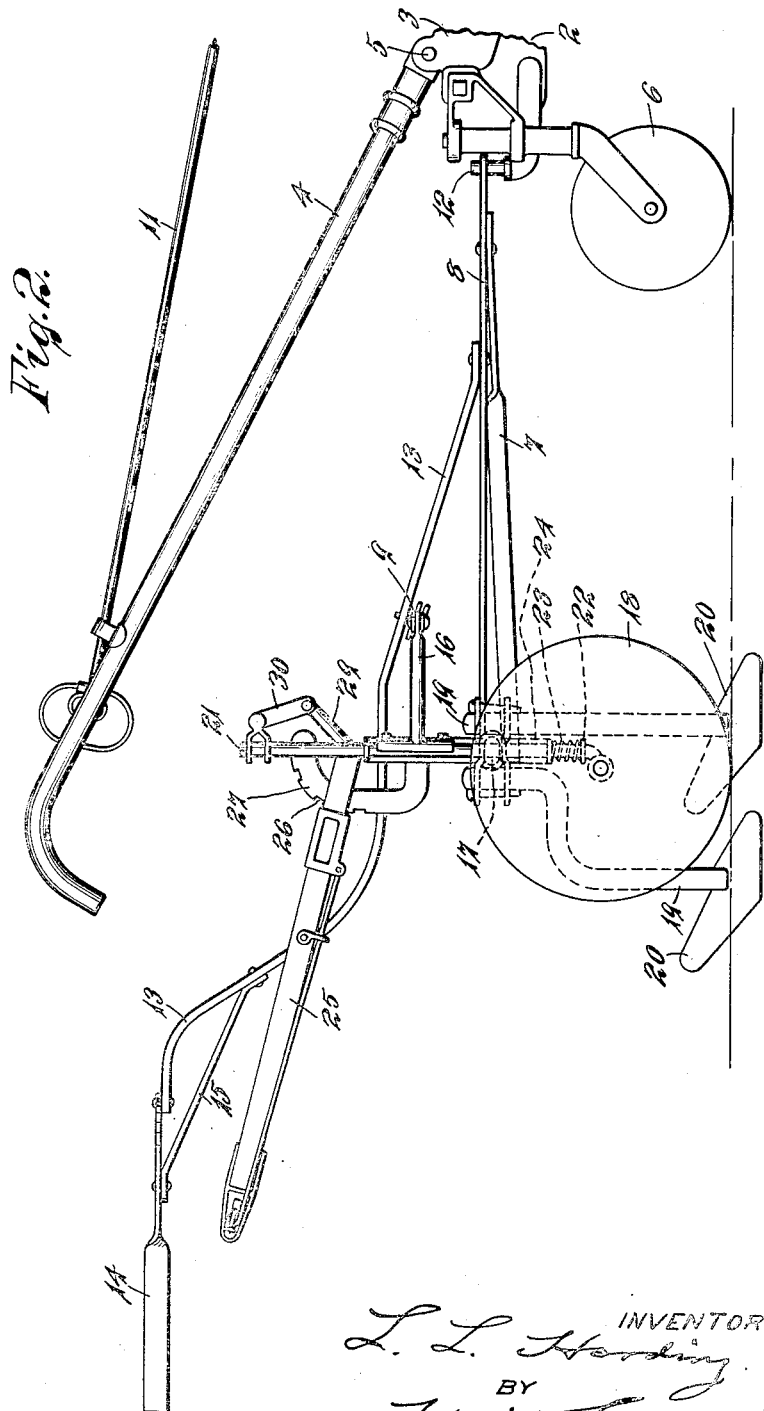

UNITED STATES PATENT OFFICE.

LEE L. HARDING, OF NEWINGTON, CONNECTICUT, ASSIGNOR TO THE NEW BRITAIN MACHINE COMPANY, OF NEW BRITAIN, CONNECTICUT, A CORPORATION OF CONNECTICUT.

WEEDER.

1,355,473.  Specification of Letters Patent.  Patented Oct. 12, 1920.

Application filed March 12, 1920. Serial No. 365,158.

*To all whom it may concern:*

Be it known that I, LEE L. HARDING, a citizen of the United States, residing at Newington, in the county of Hartford and State of Connecticut, have invented certain new and useful Improvements in Weeders, of which the following is a specification.

This invention relates to weeders such for instance as are used on farms and in like connections. I have a number of motives in view, my primary purpose however being to provide a weeder which can be connected with a walking tractor or similar draft implement in such manner that the weeder may be swung when necessary in an efficient manner for instance by the hips of the operator of the tractor, the construction desirably being such that when the tractor is turned in one direction by the operator the body of the latter will be swung in the opposite direction so as to insure proper relation between the tractor and the weeder in an accurate true manner.

In the drawings accompanying and forming part of the present specification I have shown in detail one of the several forms of embodiment of the invention which to enable those skilled in the art to practice the same will be set forth in the following description. I am not restricted to this disclosure. I may depart therefrom in several respects within the scope of the invention defined by the claims following said description.

Referring to said drawings:

Figure 1 is a top plan view of a weeder involving the invention.

Fig. 2 is a side elevation of the same.

Like characters refer to like parts in both views.

The weeder which is desirably wheeled, may be combined operatively with any of the existing forms of tractors or equivalent draft implements desirably however to one of that character known as a "walking tractor" behind which the operator or attendant customarily walks to bring about the proper government of the tractor and associated mechanism which involves in the present case the weeder.

The tractor shown is denoted in a general way by 2 although really the only part thereof which appears is the rear portion thereof, to the body 3 of which are connected in some suitable manner, for up and down movement the controlling handles 4 which diverge rearwardly and which as shown are pivoted as at 5 to the body 3 of the tractor. Said body has connected therewith as shown the rear swiveling wheels 6. I have but briefly described an existing form of walking tractor. The weeder as will be inferred, so far as tractors are concerned and particularly those of walking type, is capable of general use.

The frame of the weeder is denoted in a general way by 7. As illustrated it comprises the longitudinally-extending bar and the transverse bar 9 which present collectively a cruciform frame. The handles 4 are tied together by the cross piece 10 between their ends and this supports as shown the control rod 11 by which in part the tractor may be governed. This control rod however forms no part of the invention.

The weeder frame 7, as shown is connected with the tractor for vertical adjustment and this can be brought about for instance by perforating the extreme forward end of the longitudinally-extending bar 8 to receive the vertical stud 12 at the back end of the body or frame 3 of the tractor. This permits also the necessary lateral movement of the weeder through its frame 7, and when required the vertical adjustment thereof. To this frame 7 is connected as I will hereinafter set forth the weeder members or those by which weeding is actually accomplished.

There is united in some suitable way to the longitudinally-extending bar 8 the strip 13 which as shown extends at an upward rearward angle and which has rigidly fastened to it the transverse bar 9 to which I have referred. To the rear end of this strip 13 is fastened the yoke or bow 14 the open side of which faces rearwardly, the braces 15 being united to the sides of the yoke or bow 14 and to the strip 13. It will be understood that when the weeder is in action the attendant stands between the sides or branches of the bow or yoke 14 his hands grasping the extreme rear ends or gripping portions of the handles 4. It will be assumed that the attendant is in this position and that the tractor is in action upon a field. The attendant while walking behind the tractor traversing the field, swings the handles 4 in a certain direction and if the hips are swung in the opposite direction the weeder will positively track or follow the tractor. Desirably yet not essentially the branches or sides of the yoke or bow 14 are intended to strike the operator about the hips.

To the opposite ends of the cross piece 9 are jointed the forward ends of the arms 16, connected rigidly at their rear ends to the vertical pivot rods 21 which as shown extend through the cross bar 17, the wheels 18 which mate, moving about horizontal axes on pivots at the lower ends of said pivot rods. To the cross bar 17 are vertically adjustably connected the shanks 19 to the lower ends of which are fastened the weeding shoes or blades 20 the rear shanks 19 being of angular formation, so as to bring the rear rows of shoes or blades 20 back of the front row, the blades of the respective rows being staggered for the clearance of rubbish. Through the cross bar 17 between the ends thereof as already noted, extend the upright pivot rods 21 each having at its lower end the stop or support 22 which sustains the coiled spring 23 supporting in turn a bushing or sleeve 24 fitted around the pivot rod 21 and attached rigidly to the cross bar 17.

To the rear portion of the frame 7 is pivotally mounted between its ends, the lever 25 having a dog or pawl coöperative with the notches 26 on the segment or sector 27 connected rigidly in some suitable way to the frame 17. The forward end of this lever 25 has connected with it the bell crank lever 29 pivoted in turn to the link 30 jointed to the upper end of the rod 21. By lowering the rear end of the lever 25 the rod 21 through the intermediate described parts can be lowered in order to lower through the connections set forth, the shoes or blades 20, opposite motion of the lever securing naturally the reverse result.

What I claim is:

A weeder comprising a cruciform frame having means for its connection with a tractor, pivot rods extending through the cross bar of the frame and having wheels pivotally connected with their lower ends, springs between the wheels and the cross bar, surrounding the lower ends of the pivot rods, and means for raising and lowering the rods.

In testimony whereof I affix my signature in the presence of two witnesses.

LEE L. HARDING.

Witnesses:
ROBT. S. BROWN,
MARY M. FITZ GERALD.